United States Patent
Iwamura

(10) Patent No.: US 6,807,285 B1
(45) Date of Patent: Oct. 19, 2004

(54) EMBEDDING INFORMATION IN DIGITAL IMAGE DATA

(75) Inventor: Keiichi Iwamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/239,017

(22) Filed: Jan. 29, 1999

(30) Foreign Application Priority Data

Jan. 30, 1998 (JP) .......................................... 10-018667
Jan. 22, 1999 (JP) .......................................... 11-014937

(51) Int. Cl.[7] .............................................. G06K 9/00
(52) U.S. Cl. ...................... 382/100; 358/402; 713/176; 713/201; 713/202
(58) Field of Search ............................... 382/100, 232; 380/286, 210, 252, 287, 54; 358/402; 706/26; 713/176, 179

(56) References Cited

U.S. PATENT DOCUMENTS

| | | | | |
|---|---|---|---|---|
| 5,499,294 A | | 3/1996 | Friedman | 380/10 |
| 5,557,765 A | * | 9/1996 | Lipner et al. | 380/286 |
| 5,636,292 A | * | 6/1997 | Rhoads | 382/232 |
| 5,687,236 A | | 11/1997 | Moskowitz et al. | 380/28 |
| 5,765,176 A | * | 6/1998 | Bloomberg | 715/514 |
| 5,935,246 A | | 8/1999 | Benson | 713/200 |
| 5,983,004 A | * | 11/1999 | Shaw et al. | 709/227 |
| 5,995,625 A | * | 11/1999 | Sudia et al. | 705/51 |
| 6,023,345 A | * | 2/2000 | Bloomfield | 358/402 |
| 6,058,188 A | * | 5/2000 | Chandersekaran et al. | 380/286 |
| 6,105,015 A | * | 8/2000 | Nguyen et al. | 706/26 |
| 6,311,214 B1 | * | 10/2001 | Rhoads | 709/217 |
| 6,434,538 B1 | * | 8/2002 | Ibaraki et al. | 705/57 |
| 6,496,591 B1 | * | 12/2002 | Rhoads | 382/100 |

FOREIGN PATENT DOCUMENTS

EP 0 903 943 3/1999

OTHER PUBLICATIONS

B. Pfitzmann and M. Schunter, "Asymmetric Fingerprinting", Advances in Cryptology–Eurocrypt '96, May 12–16, 1996, pp. 84–95.

* cited by examiner

*Primary Examiner*—Jayanti K. Patel
*Assistant Examiner*—Abolfazl Tabatabai
(74) *Attorney, Agent, or Firm*—Fitzpatrick, Cella, Harper & Scinto

(57) ABSTRACT

A data processing apparatus has a first embedding unit adapted to embed first information in digital image data in accordance with a first embedding method which utilizes publicly available information. The apparatus also has a second embedding unit adapted to embed second information in the digital image data having the first information embedded therein in accordance with a second embedding method which utilizes secret information that is not made publicly available, the second information being used to detect whether the first information is altered.

48 Claims, 14 Drawing Sheets

FIG. 11

| | | |
|---|---|---|
| 1101 | IMAGE HEADER UNIT | IMAGE FORMAT IDENTIFICATION DATA |
| | | FILE SIZE |
| | | THE NUMBER OF X DIRECTION PIXEL (WIDTH) |
| | | THE NUMBER OF Y DIRECTION PIXEL (HEIGHT) |
| | | DEPTH DIRECTION SIZE |
| | | PRESENCE/ABSENCE OF COMPRESSION |
| | | RESOLUTION |
| | | OFFSET TO BIT MAP |
| | | COLOR PALETTE SIZE |
| | | PUBLIC KEY INFORMATION kp |
| 1102 | IMAGE DATA UNIT | BIT MAP |

FIG. 14

| PROPERTY NAME | ID CODE | TYPE |
|---|---|---|
| THE NUMBER OF HIERARCHY OF IMAGE DATA | 0x01000000 | VT_UI4 |
| WIDTH OF IMAGE OF MAXIMUM RESOLUTION | 0x01000002 | VT_UI4 |
| HEIGHT OF IMAGE OF MAXIMUM RESOLUTION | 0x01000003 | VT_UI4 |
| HEIGHT OF INITIAL DISPLAY | 0x01000004 | VT_R4 |
| WIDTH OF INITIAL DISPLAY | 0x01000005 | VT_R4 |

| PROPERTY NAME | ID CODE | TYPE |
|---|---|---|
| WIDTH OF IMAGE OF EACH RESOLUTION | 0x02ii0000 | VT_UI4 |
| HEIGHT OF IMAGE OF EACH RESOLUTION | 0x02ii0001 | VT_UI4 |
| COLOR OF IMAGE OF EACH RESOLUTION | 0x02ii0002 | VT_BLOB |
| FORMAT WHICH EXPRESS IMAGE OF EACH RESOLUTION NUMERICALLY | 0x02ii0003 | VT_UI4\|VT_VECTOR |

| PROPERTY NAME | ID CODE | TYPE |
|---|---|---|
| JPEG TABLE | 0x03ii0001 | VT_BLOB |
| INDEX OF MAXIMUM JPEG TABLE | 0x03000002 | VT_UI4 |

EMBEDDING INFORMATION IN DIGITAL IMAGE DATA

BACKGROUND OF THE INVENTION

1. Field of the Invention

The present invention relates to an electronic apparatus, a data processing method, a data processing system, and a computer readable storage medium, and more particularly to techniques of protecting copyright of various digital information, a digital information distribution system using such copyright protecting techniques, and an electronic commerce system.

2. Related Background Art

With recent developments of computer networks and wide spread of inexpensive and high performance computers, it is expected that services (called electronic commerce) of selling and buying commodities on networks will be prevailing. Commodities sold and bought in electronic commerce are digital data such as still images.

However, there are some problems to be solved in order to practice electronic commerce. For example, digital data has a general property that a number of perfect copies of the digital data can be made easily, and that the contents thereof can be easily altered. There is therefore a possibility that a user who bought a commodity of digital data illegally makes copy data of the same quality and redistributes it to another user. In this case, a copyright holder of the commodity or an agent (hereinafter called a sales agent) entrusted by the copyright holder cannot receive a proper countervalue to be paid for the commodity.

If the copyright holder or sales agent (hereinafter both are collectively called a server which can legally distribute commodities of digital data) once sends a commodity to a buyer, the copyright of the commodity may be infringed because it is impossible to completely prevent illegal copies of the commodity and alteration of the contents of the commodity.

As techniques of solving such problems associated with electronic commerce, techniques called "digital watermark" has been studied.

Digital watermark techniques embed copyright information of digital data and user information of a buyer in the digital data itself by processing original digital data and making it invisible. By incorporating the digital watermark techniques, if an illegal copy is found, it is possible to identify the person who redistributed the illegal copy.

As an approach to realizing the digital watermark techniques now under developments, there are a method of processing a specific frequency band by using discrete cosine transform, Fourier transform, wavelet transform or the like, and a method of directly processing the luminance value of each pixel.

Security and reliability of digital watermark techniques rely upon invisible information embedded in digital data and upon an inability of destroying key information or altering the contents thereof unless the key information regarding an information embedded location and an embedding intensity is known.

For example, in B. Pfitmann and M. Waidner: "Asymmetric Fingerprinting, EUROCRYPT 96", a system is proposed which can identify illegal distribution by embedding user information of a buyer of each image. However, even with this system, a user can illegally destroy key information or alter the contents thereof if the key information used by embedding the user information is made public.

One example of a system using digital watermark techniques is illustrated in FIG. 1.

Referring to FIG. 1, an digital watermark embedding circuit 111 on an embedding side 110 embeds information D in original image data G by using key information k. The key information k is necessary for extracting the embedded information D, and is, for example, an embedding location of the embedding information D, an embedding intensity, and the like. The image data G embedded with the embedding information D is transmitted to an external site as digital watermark image data.

An digital watermark extracting circuit 121 on an extracting side 120 extracts the embedded information D from the digital watermark image data by using key information k same as the key information on the embedding side 110.

As above, with the system shown in FIG. 1, the embedding side 110 and extracting side 120 embed and extract the digital watermark embedding information D, by using the key information k shared by both sides.

It is necessary for both the embedding side 110 and extracting side 120 to keep in secret the key information regarding an embedding location of the embedding information D, an embedding intensity and the like, in order to prevent the above-described illegal operations.

It is therefore presumed that the embedded information D can be extracted only by key information management facilities which generated the key information k or by special inspection facilities which can know the key information. The right of a copyright holder can be protected by supervising illegally redistributed digital data or digital data whose contents were altered.

From analogy to encryption techniques, such a system configuration can be considered as a scheme like the common key cryptosystem which uses the same key for an enciphering key and a deciphering key.

With the system shown in FIG. 1, however, it is necessary to keep in secret the key information k necessary for extracting the embedded information D both at the embedding side 110 and extracting side 120, so that the key information cannot be transferred freely via a network. Furthermore, the embedded information D can be extracted only by the above-described special facilities.

Since general users cannot extract the embedded information D freely, each user cannot confirm the copyright contents and legitimacy of digital data acquired from an external site. This is very inconvenient for the user.

In order to solve the above problems, the key information k necessary for extracting the embedded information D is required to be made public to general users including a maker of the electronic apparatus on the extracting side 120.

However, the publicized key information k may cause infringement of the copyright of digital data through the above-described illegal operations. Namely, if the key information k is made public in a simple manner, any one of general users can confirm the embedded information D. Therefore, the copyright of digital data cannot be protected sufficiently because of the embedded information D allowed to be confirmed by anybody.

Conventional digital watermark techniques do not therefore propose an approach to satisfying both free extraction of the embedded information D of an digital watermark by each user and protection of the copyright of digital data, without keeping in secret the key information k necessary for extraction of the embedded information D. Furthermore, the conventional digital watermark techniques do not propose copyright protection techniques using such digital watermark techniques, electronic commerce systems and digital information distribution systems using such copyright protection techniques.

SUMMARY OF THE INVENTION

An object of the present invention is to solve the above-described problems.

Another object of the invention is to provide an electronic apparatus, a data processing method, a data processing system, and a computer readable storage medium, capable of realizing copyright protection techniques satisfying both free extraction of the embedded information D of an digital watermark by each user and protection of the copyright of digital data.

As a preferred embodiment for such objects, the invention discloses an electronic apparatus comprising: first means for embedding first information in digital data; and second means for embedding second information in the digital data, the second information being used for recovering the first information.

As another preferred embodiment, the invention discloses a data processing method comprising: a first embedding step of embedding first information in digital data; and a second embedding step of embedding second information in the digital data, the second information being used for recovering the first information.

As another preferred embodiment, the invention discloses an electronic apparatus comprising: extracting means for extracting second information from digital data which is embedded with first information and the second information, the second information being used for recovering the first information; and recovering means for recovering the first information in accordance with the second information.

As another preferred embodiment, the invention discloses a data processing method comprising: an extracting step of extracting second information from digital data which is embedded with first information and the second information, the second information being used for recovering the first information; and a recovering step of recovering the first information in accordance with the second information.

As another preferred embodiment, the invention discloses an electronic apparatus comprising: input means for inputting digital data; and embedding means for embedding predetermined information in the digital data by using key information made public.

As another preferred embodiment, the invention discloses a data processing method comprising: an input step of inputting digital data; and an embedding step of embedding predetermined information in the digital data by using key information made public.

As another preferred embodiment, the invention discloses an electronic apparatus comprising: input means for inputting digital data; and extracting means for extracting predetermined information from the digital data by using key information made public.

As another preferred embodiment, the invention discloses a data processing method comprising: an input step of inputting digital data; and an extracting step of extracting predetermined information from the digital data by using key information made public.

As another preferred embodiment, the invention discloses a data processing system comprising: a first apparatus for embedding predetermined information in digital data by using key information made public; and a second apparatus for extracting predetermined information embedded in the digital data by using the key information made public.

As another preferred embodiment, the invention discloses a computer readable storage medium storing a program which realizes: a first embedding step of embedding first information in digital data; and a second embedding step of embedding second information in the digital data, the second information being used for recovering the first information.

As another preferred embodiment, the invention discloses a computer readable storage medium storing a program which realizes: an extracting step of extracting second information from digital data which is embedded with first information and the second information, the second information being used for recovering the first information; and a recovering step of recovering the first information in accordance with the second information.

Still other objects of the present invention, and the advantages thereof, will become fully apparent from the following detailed description of the embodiments.

BRIEF DESCRIPTION OF THE DRAWINGS

FIG. 11 is a diagram illustrating a general image file format.

FIG. 14 is a diagram illustrating the types of information described in an image content property set shown in FIG. 12.

DETAILED DESCRIPTION OF THE PREFERRED EMBODIMENTS

The preferred embodiments of the present invention will now be described in detail hereinafter with reference to the accompanying drawings.

First Embodiment

A first embodiment is applied to a system including an electronic apparatus (hereinafter called an embedding apparatus) 200 having an digital watermark embedding function to be described later and an electronic apparatus (hereinafter called an extracting apparatus) 300 having an digital watermark extracting function to be described later.

The structures and operations of the embedding apparatus 200 and extracting apparatus 300 of the first embodiment will be described.

Figure 1:
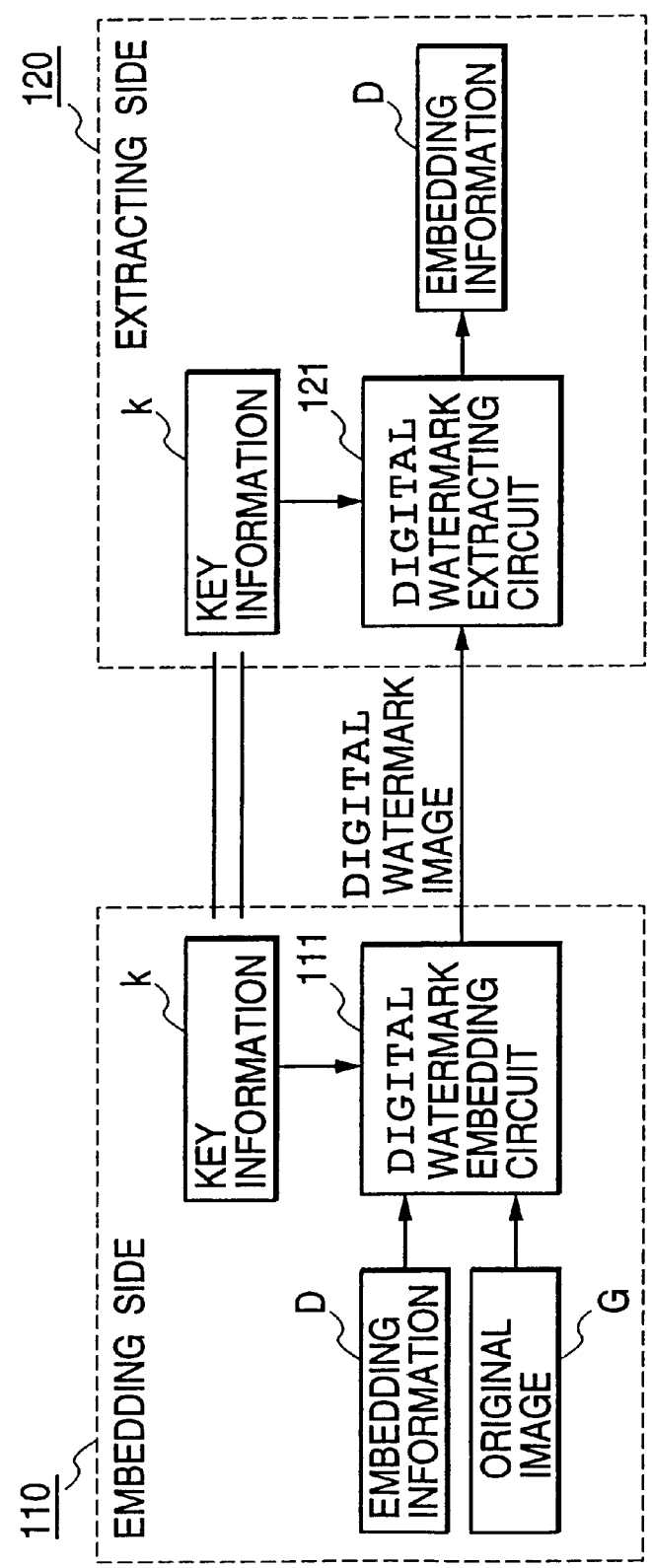
FIG. 1 is a diagram illustrating a conventional system.
Figure 2:
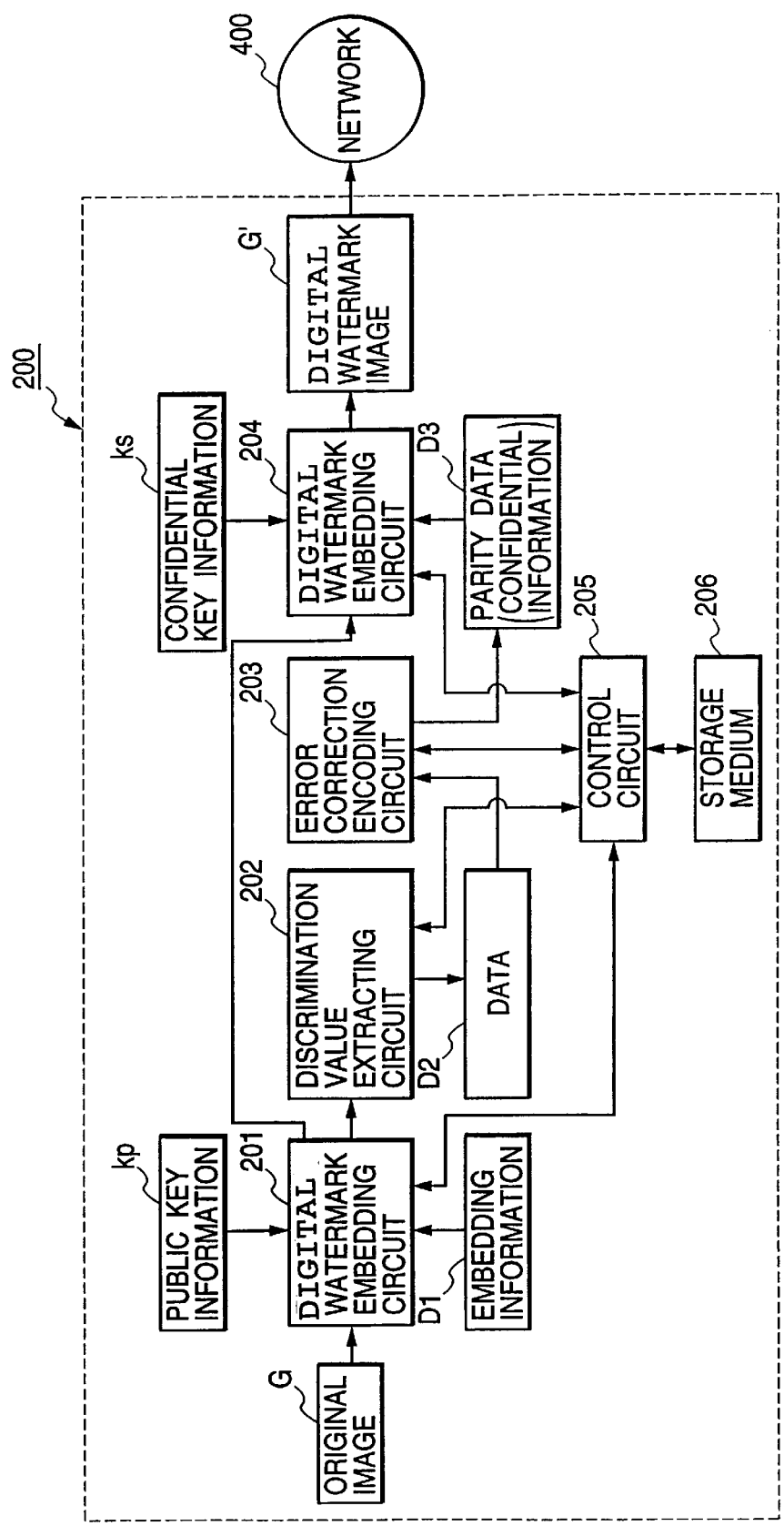
FIG. 2 is a diagram illustrating the structure of an embedding apparatus according to a first embodiment of the invention.

FIG. 2 is a diagram showing the structure of the embedding apparatus 200 of the first embodiment. The embedding apparatus 200 is an electronic apparatus such as a personal computer, a digital camera, a digital video recorder, a digital recorder with an integrated camera, and a scanner, or an expansion unit capable of being mounted on these electronic apparatuses.

Referring to FIG. 2, the embedding apparatus 200 includes: an digital watermark embedding circuit 201 to which digital image data (original image data) G, public key information kp, and embedding information D1 are supplied; a discrimination value extracting circuit 202 to which an output of the digital watermark embedding circuit 201 is supplied; an error correction encoding circuit 203 to which an output (data D2) of the error correction encoding circuit 202 is supplied; and an digital watermark embedding circuit 204 to which an output (parity data D3) of the error correction encoding circuit 203, confidential key information ks, and an output (original image data G and embedding formation D1 are supplied.

The embedding apparatus 200 further includes; a control circuit 205 for controlling the whole operation of the embedding apparatus 200 in accordance with an embedding method of the embodiment to be described later; and a storage medium 206 storing program codes realizing the embedding method of the embodiment.

The public key information kp is necessary for embedding the embedding information D1 including, for example, an embedding location and an embedding procedure), and is made public. This public key information kp is made public, for example, by an electronic bulletin-board, a home page, or the like of the electronic apparatus connected to a network 400.

The original image data G may be not only image data of a still image or a moving image, but also other digital data such as voice data, text data, graphics data, and program data. The embedding information D1 is an digital watermark for protecting and managing the copyright of the original image data G.

Figure 3:
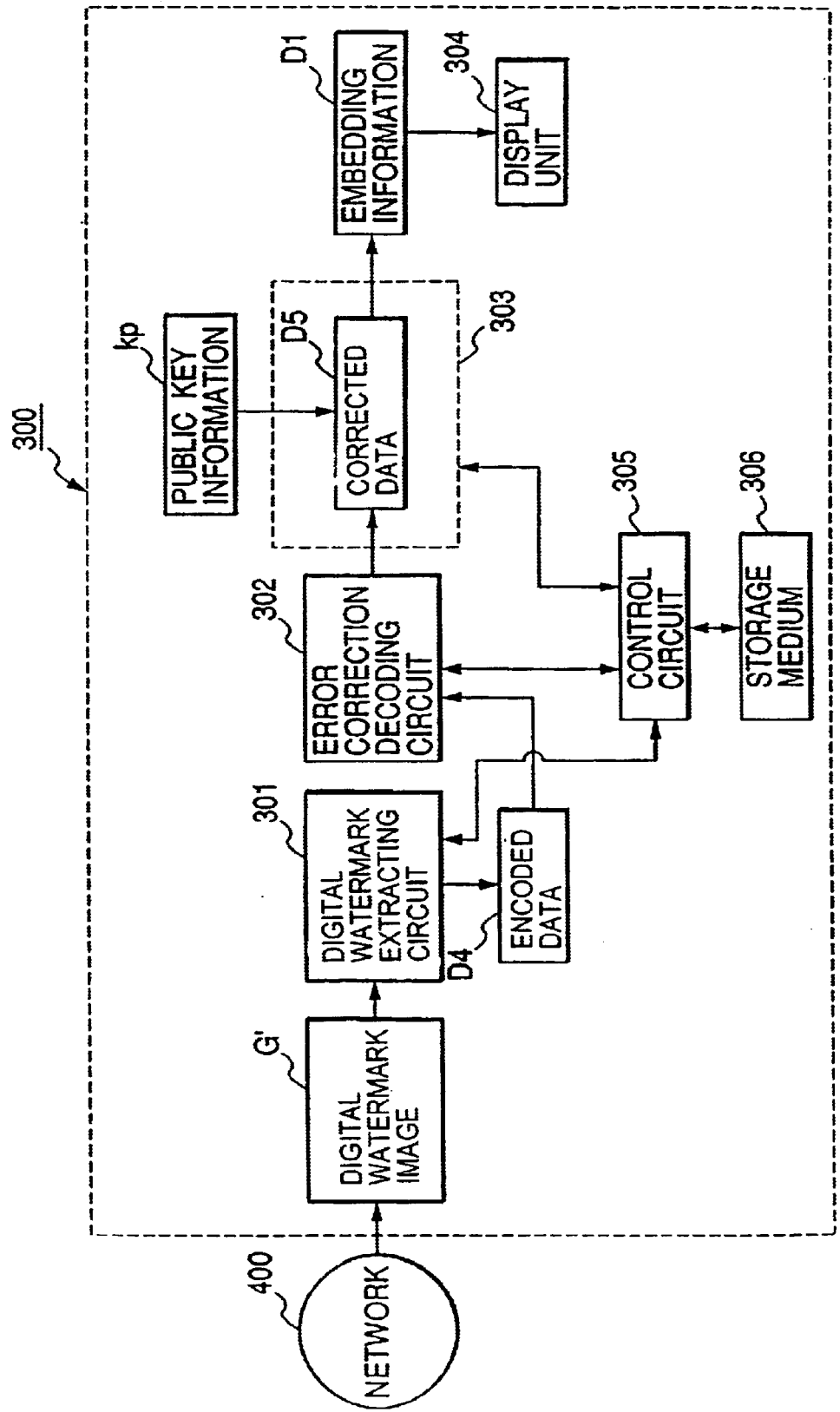
FIG. 3 is a diagram illustrating the structure of an extracting apparatus according to the first embodiment.

FIG. 3 is a diagram showing the structure of the extracting apparatus 300 of the embodiment. The extracting apparatus 300 is an electronic apparatus such as a personal computer and a digital camera, or an expansion unit capable of being mounted on these electronic apparatuses.

Referring to FIG. 3, the extracting apparatus 300 includes: an digital watermark extracting circuit 301 to which digital watermark image data G, embedded with the embedding information D1 is input; an error correction decoding circuit 302 to which an output (encoded data D4) of the digital watermark extracting circuit 301 is supplied; and an digital watermark extracting circuit 303 to which an output (corrected data D5) of the error correction decoding circuit 302 is supplied.

The extracting apparatus 300 further includes; a control circuit 305 for controlling the whole operation of the extracting apparatus 300 in accordance with an extracting method of the embodiment to be described later; and a storage medium 306 storing program codes realizing the extracting method of the embodiment.

Next, the operation to be executed by the embedding apparatus 200 will be described.

The digital watermark embedding circuit 201 of the embedding apparatus 200 embeds the embedding information D1 by processing the original data G with the public key information kp.

In this embodiment, the public key information kp for extracting the embedded information D is made public as described earlier. Therefore, not only the above-described special facilities but also any one of general users can know the embedding location, embedding intensity, embedding procedure and the like of the embedding information D1, and can extract the embedded information D1 in accordance with the public key information kp, to thereby confirm the contents of the embedded information D1. The public key information kp may be acquired by the embedding apparatus via the external network 400 or may be stored in advance in the embedding apparatus 200.

If the public key information kp is made public, there is a fear of infringing the copyright of the original image data G through destruction or alteration of the embedded information D1 by an illegal user.

In order to eliminate such destruction or alteration of the embedded information D1, the embedding apparatus of the embodiment further embeds "confidential information" in the original image data G. The confidential information is used for recovering the embedded information D1. By using this confidential information, the extracting apparatus 300 can recover the destroyed, modified, or altered embedded information.

In this embodiment, the embedded information D1 can be recovered by using, for example, error correction encoding and decoding. For example, the confidential information is generated by using data detected from a unit (hereinafter called a public information embedding unit) where the embedding information D1 was embedded and a unit (hereinafter called a non-information embedding unit) where neither the embedding information D1 nor the confidential information is embedded. The confidential information is recovered by directly using data detected from three regions including the public information embedding unit, a unit (hereinafter called a confidential information embedding unit) where the confidential information is embedded, and the non-information embedding unit.

The confidential information can be generated by using data detected from the non-information embedding unit because a location of the confidential information embedded in the original image data G can be unidentified.

The discrimination value extracting circuit 202 discriminates two regions from the original image data G (original image data G and embedded information D1) with the embedding information D1 embedded by the digital watermark embedding circuit 201. Namely, it discriminates the public information embedding unit and a unit other than the public information embedding unit. The discrimination value extracting circuit 202 further determines the confidential information embedding unit and non-information embedding unit from the unit other than the public information embedding unit, in accordance with predetermined rules. The size of each embedding unit region changes with a length of the embedding information D1 embedded in the public information embedding unit, a recovery ability (in this embodiment, error correction ability) necessary for recovering the embedded information D1, and the like.

In accordance with the public information embedding unit and non-information embedding unit, the discrimination value extracting circuit 202 detects data D2 in accordance with predetermined rules, and supplies the data D2 (including detection data corresponding to the embedded information D1) to the error correction encoding circuit 203. A procedure of generating the data D2 will be described later.

Although the discrimination value discriminating circuit 202 is provided at the succeeding stage of the digital watermark embedding circuit 201, it may be provided at the preceding stage of the digital watermark embedding circuit 201 as will be later described.

The error correction encoding circuit 203 generates error codes (parity data) D3 of the data D2 supplied from the discrimination value extracting circuit 202, by a predetermined error correction encoding process, and supplies it as the confidential information for recovering the embedded information D1, to the digital watermark embedding circuit 204.

The digital watermark embedding circuit 204 embeds the confidential information (i.e., parity data D3) supplied from the error correction encoding circuit 203, in the confidential information embedding unit determined by the discrimination value extracting circuit 202, and outputs the results as the digital watermark image data G'.

As described above, the embedding apparatus 200 can generate the digital watermark image data G' (G+D1+D3) embedded with the embedding information D1 and confidential information D3, by processing the original image data. The digital watermark image data G' is supplied via the network to the extracting apparatus 300.

Next, the operation to be executed by the extracting apparatus will be described.

The digital watermark extracting circuit 301 of the extracting apparatus 300 extracts the encoding list data D4 (including the confidential information D3) from the digital watermark image data G' by using an extracting method compatible with the embedding method used by the embedding apparatus 200, and supplies it to the error correction decoding circuit 302. The digital watermark extracting circuit 301 can also extract only the embedded information D1 from the digital watermark image data G' by using the public key information kp unnecessary for being kept in secret. The public key information kp may be acquired by the extracting apparatus 300 via the external network 400 or may be stored in advance in the extracting apparatus 300.

The extracting method used by the digital watermark extracting circuit 301 is not limited only to the method compatible with the embedding method used by the embedding apparatus 200, but other methods may be used. A process of extracting the encoded data D4 will be later described.

The error correction decoding circuit 302 error correction decodes the data D2 by using the parity data D3 (i.e., confidential information) contained in the encoded data D4 (D2+D3), and supplies the result as the corrected data D5 to the digital watermark extracting circuit 303. With this process, the embedded information D1 can be recovered even if it is destroyed.

The digital watermark extracting circuit 303 detects the embedded information D1 from the corrected data D5 supplied from the error correction decoding circuit 302, by using the public key information kp.

As described above, the extracting apparatus 300 can recover the embedded information D1 extracted from the digital watermark image data G', by using the confidential information D3. If the embedded information D1 is displayed on a display unit 304, copyright information, user information and the like of the digital watermark image data G' can be visually confirmed.

With the configuration of the first embodiment described above, the key information kp necessary for extracting the embedded information D1 is not required to be kept in secret, and any user can freely extract the embedded information D1 and confirm the contents thereof. Even if the embedded information D1 is destroyed or altered by an illegal user, the embedded information D1 can be recovered by using the confidential information D3 so that the copyright of the original image data G can be protected sufficiently and the reliability and security of the embedded information D1 can be improved.

The extracting apparatus 300 of this embodiment may be configured such that the embedded information D1 extracted by the digital watermark extracting circuit 301 is compared with the embedded information D1 extracted by the digital watermark extracting circuit 303 to detect whether or not the embedding information D1 embedded in the digital watermark image data G' was altered. In this case, an alteration detecting function can be added to the extracting apparatus 300 so that the copyright of the digital watermark image data G' can be further improved. If the alteration detection result is displayed on the display unit 304, legitimacy of the digital watermark image data G' can be visually notified to a user.

The alteration detecting function of the extracting apparatus 300 is not limited to the function described above. For example, alteration of the embedded information D1 may be judged if errors of the correction list data D4 exceeds a correction ability of the error correction decoding circuit 302 (i.e., if the error correction becomes impossible). In this manner, a simple alteration detecting function can be added to the extracting apparatus 300.

Next, examples of the embedding method used by the embedding apparatus 200 and the extracting method used by the extracting apparatus 300 will be described in detail with reference to FIGS. 4 to 6.

(1) Embedding Method

Figure 4:
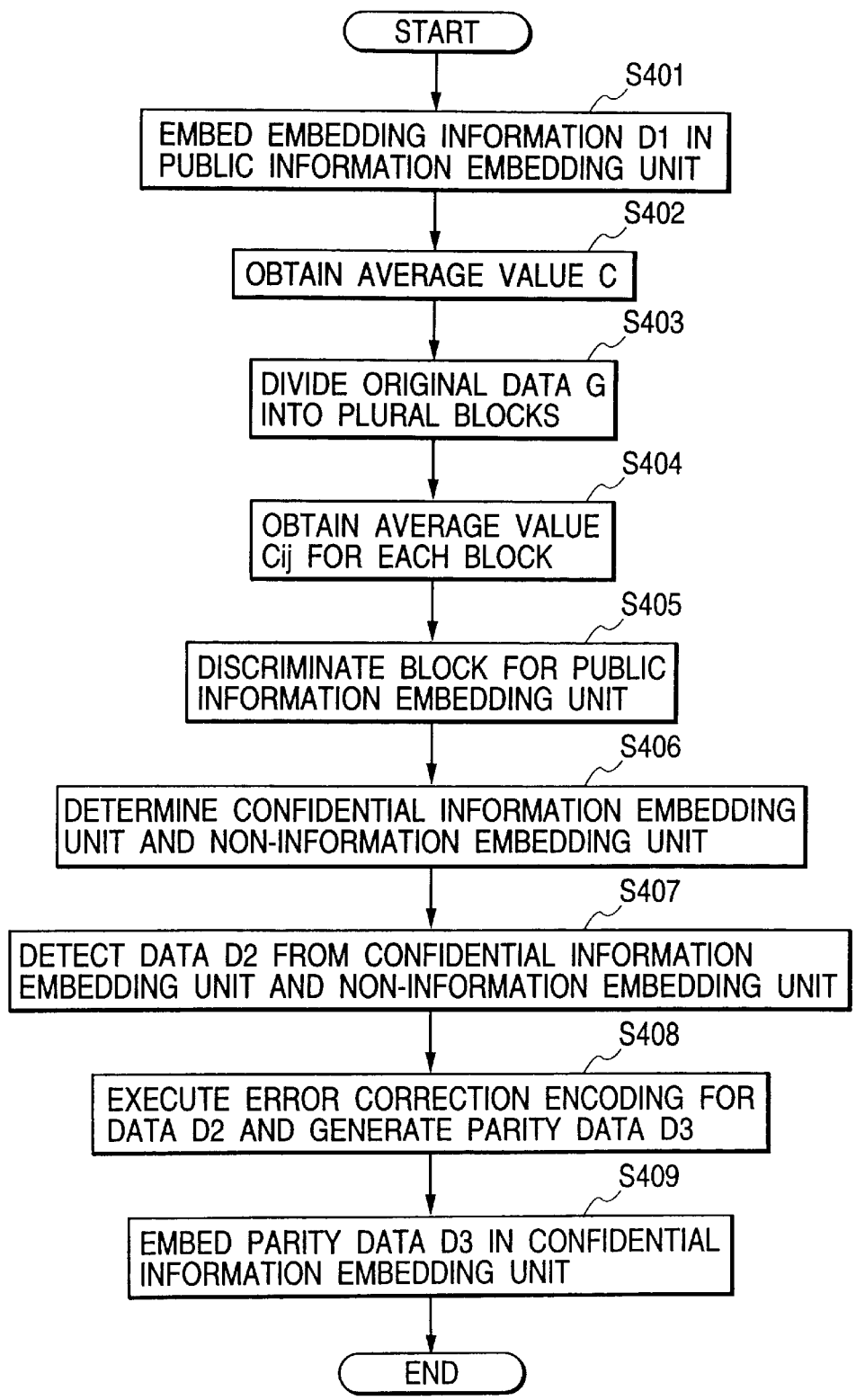
FIG. 4 is a flow chart illustrating in detail an embedding method according to the first embodiment.

FIG. 4 is a flow chart illustrating the embedding method according to the embodiment of the invention.

First, the embedding procedure of embedding the embedding information D1 in the public information embedding unit will be described.

The digital watermark embedding circuit 201 embeds the embedding information D1 in the original image data G by processing the original image data G with the public key information kp (Step S401). In this case, the digital watermark embedding circuit 201 processes the image data in the public information embedding unit in accordance with predetermined rules.

The predetermined rules are, for example, assuming that the variables to be embedded are the luminance values of pixels of the original image data G, the rules defining a relation between an average value C of luminances of the original image data G (i.e., an average value of luminances of all pixels) and an average value $C_{ij}$ of luminances of each of blocks constituting the public information embedding unit. For example, if "1" is to be embedded in a certain block, the average value $C_{ij}$ of luminances of the block is set to satisfy "$C \leq C_{ij}$" whereas if "0" is to be embedded in a certain block, the average value $C_{ij}$ of luminances of the block is set to satisfy "$C > C_{ij}$".

Figure 5:
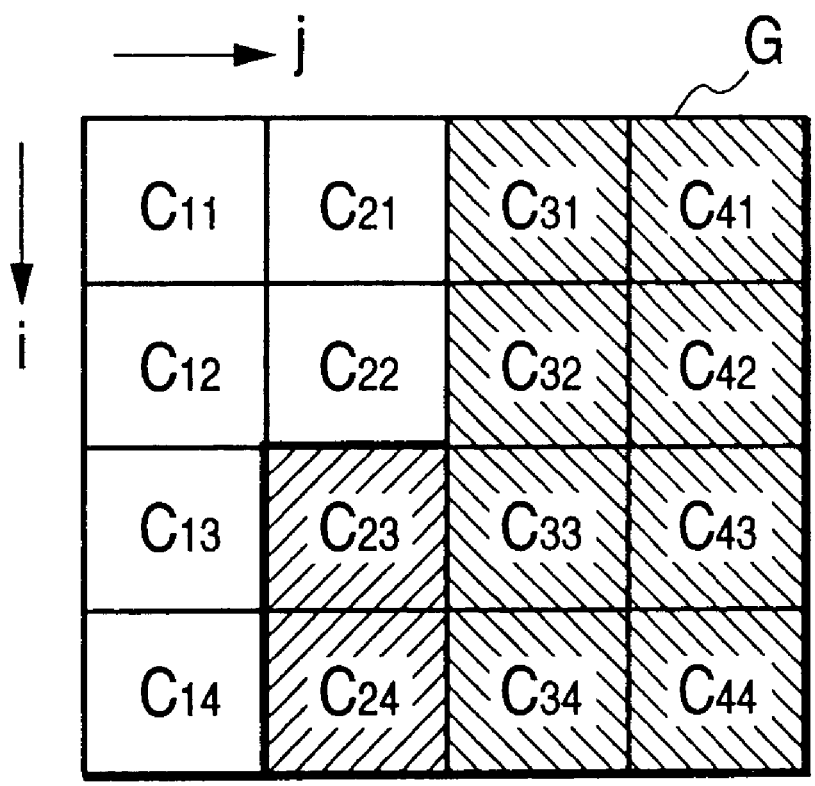
FIG. 5 is a diagram illustrating an embedding process for an original image.

More specifically, as shown in FIG. 5, assuming that the blocks constituting the public information embedding unit are $C_{23}$ and $C_{24}$ and the embedding information D1 to be embedded in the blocks is {1, 0}, then the digital watermark embedding circuit 201 sets the average values $C_{23}$ and $C_{24}$ of luminances of the blocks so as to satisfy "$C \leq C_{23}$" and "$C > C_{24}$", respectively. In this embodiment, the range of operation of each block is determined by the embedding intensity. Also in this embodiment, the positions and embedding intensities of the blocks constituting the public information embedding unit are information permitted to be made public to general users.

Next, the embedding procedure for the confidential information D3 will be described.

For example, assuming that the variables to be embedded are the luminance values of pixels of the original image data G, the discrimination value extracting circuit 202 obtains an average (hereinafter represented by "C") of luminances of the original image data G (Step S402).

Next, as shown in FIG. 5, the discrimination value extracting circuit 202 divides the original image data G into a plurality of blocks (in this example, 4×4=16 blocks) (Step S403), and obtains the average value of luminances of each block (Step S404).

In FIG. 5, the average value of luminances of vertical i-th and horizontal j-th block is represented by "$C_{ij}$".

Next, the order of the blocks is determined. In this example, it is assumed that the order is $C_{11}$, $C_{12}$, $C_{13}$, $C_{14}$, $C_{21}$, $C_{22}$, ..., $C_{43}$, $C_{44}$.

Next the discrimination value extracting circuit 202 discriminates the block (i.e., public information embedding unit) into which the embedding information D1 was embedded (Step S405). In this embodiment, the embedding information D1 is embedded to each block of the public information embedding unit according to the predetermined rules mentioned in the Step S401.

Next, the discrimination value extracting circuit 202 determines the block (i.e., confidential information embedding unit) where the confidential information D3 is embedded and the block (i.e., non-information embedding unit) where neither the embedding information D1 nor confidential information D3 is embedded (Step S406).

In the example shown in FIG. 5, the blocks $C_{31}$, $C_{32}$, $C_{33}$, $C_{34}$, $C_{41}$, $C_{42}$, $C_{43}$, and $C_{44}$ are allocated to the confidential information embedding unit, and the blocks $C_{11}$, $C_{12}$, $C_{13}$, $C_{14}$, $C_{21}$, and $C_{22}$ are allocated to the non-information embedding unit.

The discrimination value extracting circuit 202 performs a predetermined discrimination process for the public information embedding unit and non-information embedding unit to thereby detect the data D2 (Step S407). For example, the discrimination value extracting circuit 202 performs a discrimination process of setting the average value $C_{ij}$ of luminance values of each block to "1" if "$C \leq C_{ij}$" and "0" if "$C > C_{ij}$", and detects "1" or "0" of each block in the predetermined block order. This detection results are the data D2.

In this embodiment, the rules of embedding the embedding information D1 in the public information embedding unit are the same as the rules of detecting the data D2 from the public information embedding unit and non-information embedding unit (i.e., $C_{ij}$="1" if $C \leq C_{ij}$, and $C_{ij}$="0" if $C > C_{ij}$). The rules are not limited only to the above rules, but different rules may also be used if they satisfy a predetermined relation (i.e., one-to-one correspondence relation between a portion of the data D2 and the embedding information D1).

Next, the discrimination value extracting circuit 202 supplies the data D2 detected from each block of the public information embedding unit and non-information embedding unit in accordance with the predetermined rules, to the error correction encoding circuit 203. The error correction encoding circuit 203 error-correction encodes the data D2 to generate the parity data D3 (Step S408). In this embodiment, this parity data D3 is the confidential information.

Next, the digital watermark embedding circuit 204 embeds the parity data D3 in the confidential information embedding unit in accordance with the confidential key information ks (Step S409).

The confidential key information ks to be used in the digital watermark embedding circuit 204 includes at least position of the confidential information embedding unit. The confidential key information ks is not made public as different from the public key information kp.

The rules of embedding the confidential information D3 are the same as the rules of detecting data D2 from the confidential information embedding unit and non-information embedding unit in the step S 419. Therefore, the extracting apparatus 300 can extract the confidential information D3 and the data D2 in such simple rules. Also, the processes in the side of the extracting apparatus 300 can be simplified when the rules of embedding the confidential information D3 are the same as the rules of embedding the public information D1. The embedding rules at Step S409 may be different from the above-described rules.

For example, as shown in FIG. 5, if the blocks $C_{11}$ to $C_{22}$ are allocated to the non-information embedding unit, the blocks $C_{23}$ and $C_{24}$ are allocated to the public information embedding unit, and the blocks $C_{31}$ to $C_{44}$ are allocated to the confidential information embedding unit, then the digital watermark embedding circuit 204 embeds "1" by processing the average value $C_{ij}$, of luminances of each block so as to satisfy "$C \leq C_{ij}$, and "0" by processing the average value $C_{ij}$ of luminances of each block so as to satisfy "$C > C_{ij}$".

The error correction encoding method to be used by the error correction encoding circuit 203 may use, for example, (15, 7, 5) BCH codes (refer to Hideki IMAI "Coding Theory", Chapter 7.1, The Institute of Electronics, Information and Communication Engineers). In this case, error correction codes can be generated having the code length of "15" detected from the blocks $C_{12}$ to $C_{44}$, the information length of "7" detected from the blocks $C_{12}$ to $C_{24}$, and the shortest distance of "5". In this case, each of the blocks $C_{31}$ to $C_{44}$ is embedded with the 8-bit parity data D3 calculated from the data detected from each of the blocks $C_{12}$ to $C_{24}$.

In the embedding method of this embodiment, the error correction encoding process is performed by using (15, 7, 5) BCH codes. The error correction encoding process is not limited only to the above. For example, each block may be further divided to make large at least one of the public information embedding unit and confidential information embedding unit, to thereby adopt an error correction encoding method with an improved error correction ability.

(2) Extracting Method

Figure 6:
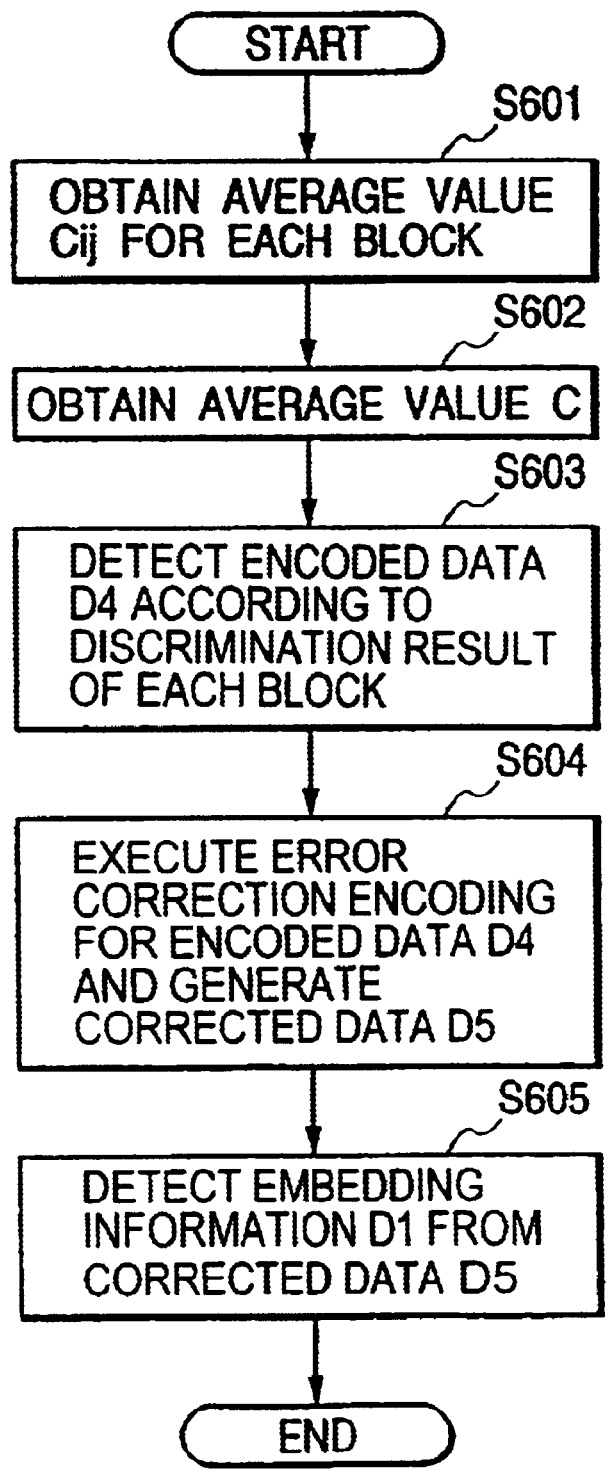
FIG. 6 is a flow chart illustrating in detail an extracting method according to the first embodiment.

FIG. 6 is a flow chart illustrating the extracting method of this embodiment.

In this embodiment, the information necessary for the extracting method is made public as a portion of the public key information kp, the information including the positions of blocks (in this example, blocks $C_{23}$ and $C_{24}$) determined as the public information embedding unit, and the embedding and extracting rules for the embedding information D1.

First, the digital watermark extracting circuit 301 is input with the digital image data embedded with the embedding information D1 (i.e., digital watermark image data G'), divides it into a plurality of blocks (4×4=16 blocks) as shown in FIG. 4, and obtains the average value $C_{ij}$ of luminances of each block (Step S601).

Next, the digital watermark extracting circuit 301 obtains an average value (i.e., average value of luminances of all pixels) C of luminances of the digital watermark image data G' (Step S602). The average value C may be made public as a portion of the public key information kp.

Next, the digital watermark extracting circuit 301 performs a discrimination process for all blocks shown in FIG. 5 in accordance with predetermined rules. The predetermined rules correspond to the above-described embedding rules, and are, for example, the rules of setting the average values of luminances of each block to $C_{ij}$="1" if "C≦$C_{ij}$", and to "0" if "C>$C_{ij}$". The discrimination results of all the blocks are arranged in the predetermined block order to generate the encoded data D4. The encoded data D4 is supplied to the error correction decoding circuit 302.

The error correction decoding circuit 302 performs an error correction decoding process corresponding to the error correction encoding process of the above described embedding method, by using the encoded data D4 (Step S604). The decoded encoded data D4 is supplied as the corrected data D5 to the digital watermark extracting circuit 303.

For example, if information in each of the blocks $C_{23}$ and $C_{24}$ in the public key information embedding unit was destroyed, if its pixel value was altered, or if any pixel was removed, the encoded data D4 contains at least errors of two bits. However, since the encoded data D4 is error-correction encoded by the predetermined rules (e.g., (15, 7, 5) BCH codes), if the decoding process corresponding to the predetermined rules is performed, it is possible to correct at least errors of two bits destroyed or altered, and to recover the original information. The error correction decoding circuit 302 can therefore obtain the corrected data D5.

The digital watermark extracting circuit 303 extracts the embedding information D1 (i.e., data in one-to-one correspondence with the embedding information D1) from the correction list data D5, the embedding information in this example being {1, 0} (Step S605). Even if the embedding information is destroyed, the extracting apparatus 300 can obtain always the correct embedding information D1 if the errors are in a recoverable range. The embedding information D1 is detected from the correction list data D5 in accordance with the public key information kp (e.g., the position of the public information embedding unit).

In the extracting method of this embodiment, error correction codes capable of correcting at least errors of two bits are extracted and decoded. The extracting method is not limited only to the above. For example, the block may be divided further to make large the size of the confidential information embedding unit where the parity data is embedded, so that errors of two bits or larger and errors generated in the information other than the embedding information can be corrected.

Figure 7A:
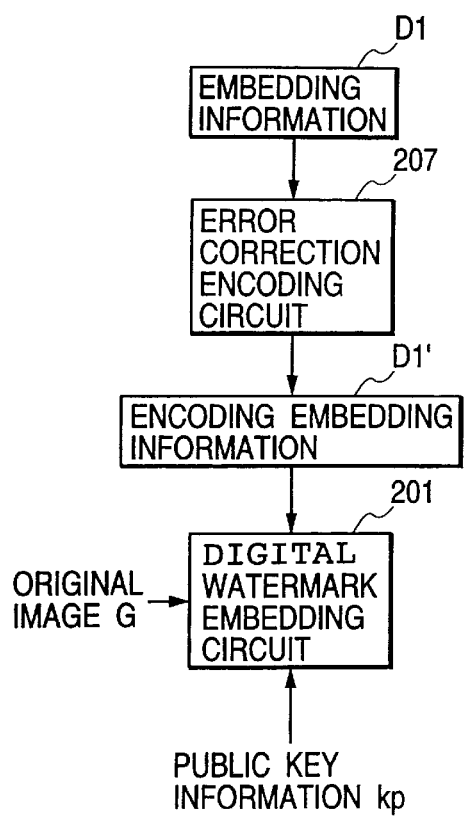
FIGS. 7A and 7B are diagrams illustrating other examples of the embedding apparatus according to modifications of the first embodiment.
Figure 7B:
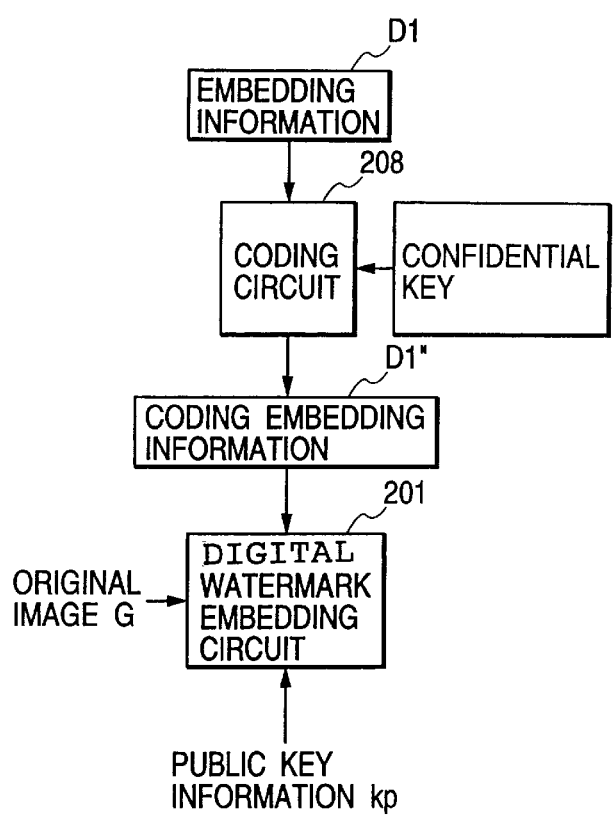
Figure 8:
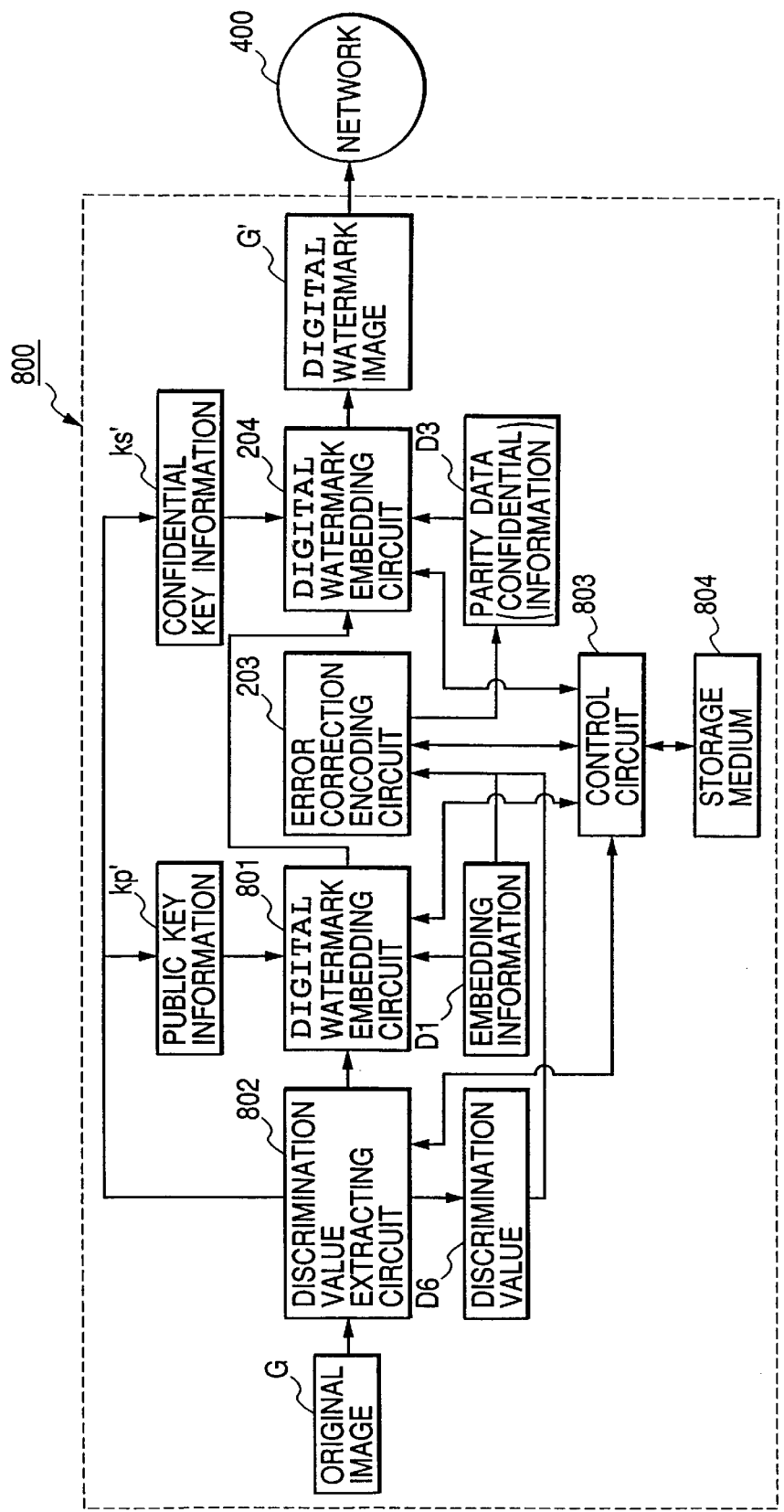
FIG. 8 is a diagram illustrating another example of the embedding apparatus according to modifications of the first embodiment.

By utilizing the above-described embedding and extracting method, other various embedding and extracting methods can be realized which provide a variety of advantageous effects such as improvements on durability of embedding information, improvements on error correction ability of extracted information, and suppression of image quality deterioration of an original image. With reference to FIGS. 7A, 7B and 8, modifications (1) to (6) of the first embodiment will be described. In FIGS. 7A, 7B and 8, processing units having the function similar to those illustrated in FIG. 2 are represented by using identical reference numerals, and the detailed description thereof is omitted.

(1) In the above embodiment, the embedding apparatus 200 embeds the embedding information D1 in the original image data G without encoding the embedding information D1. The embodiment is not limited only to the above. For example, the embedding information D1 may be encoded by an error correction encoding process or by one way function operations like an encryption process.

The embedding apparatus 200 may be provided with an error correction encoding circuit 207 such as shown in FIG. 7A. In this case, the error correction encoding circuit 207 error-correction encodes the embedding information D1.

The embedding apparatus 200 may be provided with an enciphering circuit (coding circuit) 208 having a public key cryptosystem function such as shown in FIG. 7B. In this case, the enciphering circuit 207 enciphers the embedding information by using a secret key.

The embedding apparatus 200 may be provided with a combination of the error correction encoding circuit 207 shown in FIG. 7A and the enciphering circuit 208 shown in FIG. 7B. In this case, the embedding information is alternately encoded and enciphered.

The one way function is a function y=f(x) which can easily calculate y from x but is difficult to calculate x from y. For example, prime factorization of an integer having a large number of digits, discrete logarithm, and the like are used widely as a one way function.

With the above configurations, the digital watermark embedding circuit 201 of the embedding apparatus 200 is supplied not with the embedding information itself but with one of the embedding information D1 (i.e., encoded embedding information D1') error-correction encoded by the error correction encoding circuit 207, the embedding information D1 (i.e., enciphered embedding information D1") enciphered by the enciphering circuit 208, and the embedding information D1 encoded and enciphered by the combination of the error correction encoding circuit 207 and enciphering circuit 208. With the above configurations, durability of the embedding information D1, ability of correcting errors in the embedding information D1, and security and reliability of the embedding information D1 can be improved.

If the embedding apparatus 200 is structured as described above, the extracting apparatus 300 is also structured in correspondence with the configuration shown in FIG. 7A, the configuration shown in FIG. 7B, or the configuration combining those shown in FIGS. 7A and 7B. In this manner, the extracting apparatus 300 can extract the encoded/enciphered embedding information D1.

(2) In the above-described embedding and extracting method, the embedding information D1 is embedded in the public information embedding unit without encoding the embedding information D1. The embodiment is not limited only to the above. For example, similar to the embedding apparatus 200 having the configuration shown in FIG. 7A, the data (i.e., the embedding information D1') of the embedding information D1 error-correction encoded may be embedded in the public information embedding unit of the original image data G.

In this case, the extracting apparatus 200 decodes the information detected from the public information embedding unit and other units, and detects and corrects any error. If information (i.e., embedding information D1') detected from the public information embedding unit has any error, the extracting apparatus 200 further decodes the information to correct the error. In this manner, the error correction ability can be improved further. Furthermore, since the ability of recovering the embedding information D1 can be improved further, durability of the embedding information can be further improved.

(3) In the embedding method of the embodiment, blocks for the public information embedding unit and confidential information embedding unit can be selected arbitrarily and randomly. For examples, the blocks are selected as in the following.

If the value $C_{ij}$ is near C, "$C \leq C_{ij}$" when the information is embedded may become "$C > C_{ij}$" when the information is extracted, because the value $C_{ij}$ is likely to be changed by compression or various alterations.

When such block is selected as non-information embedding unit, it occurs that data D2 is detected in error when extracting.

In view of the above, the block having a weak durability, i.e., the blocks having the value $C_{ij}$ near C, are used for embedding the embedding information D1 or confidential information D3, and these blocks are operated to provide in advance an intensity of some degree. In this manner, an digital watermark embedding method can be realized which has durability against compression and various alterations.

In this case, the blocks having the value $C_{ij}$ near C are subject to operation of "$C \leq C_{ij}$" or "$C > C_{ij}$". Therefore, the change amount can be suppressed approximately by a half and the image quality deterioration can be reduced (for example, if the block having the value $C_{ij}$ considerably larger than C is subject to operation of $C > C_{ij}$, the image quality deterioration becomes large).

The blocks having the value $C_{ij}$ not near C are selected for the non-information embedding unit, for example, by using the configuration of the embedding apparatus 200 shown in FIG. 8. In this case, a discrimination value extracting circuit 802 is provided at the preceding stage of an digital watermark embedding circuit 801, the discrimination value extracting circuit 802 extracts the discrimination value of each block of the original image data G, and in accordance with the discrimination values, the blocks for embedding each piece of information are determined.

If the blocks are selected as described above, the image quality deterioration of an digital watermark image can be reduced further, and durability of the embedding information D1 can be made stronger.

(4) In the embedding method of the embodiment, the block order may be determined arbitrarily. The confidential information D3 may be embedded by determining the block order in the following manner.

For example, in the embedding apparatus 800 shown in FIG. 8, after the average value $C_{ij}$ of luminances of each block of the original image data G is discriminated, the block order is determined so that the discrimination value itself of each block of the original image data G becomes the confidential information for recovering the embedding information D1.

In this case, the number of blocks in which information is embedded (i.e., in which the image data is operated) becomes approximately the shortest distance and is nearly constant independently from the original image data G and embedding information D1.

More specifically, in the configuration shown in FIG. 8, after the discrimination value extracting circuit 202 discriminates the average value $C_{ij}$ of luminances of each block of the original image data G, the block order is determined arbitrarily by using the blocks having the value $C_{ij}$ not near C as the blocks for the non-information embedding unit. Next, the discrimination value extracting circuit 802 determines the block order arbitrarily by using some of the blocks having the value $C_{ij}$ near C as the blocks for the public information embedding unit. The error correction encoding circuit 203 executes error correction encoding as D6, for the discrimination value of the block of the public information embedding unit and the discrimination value of the block of non-information embedding unit aligned according to the order defined in the discrimination value extracting circuit 802. Subsequently, the error correction encoding circuit 203 supplies the parity data D3 of the data D6 to the digital watermark embedding circuit 204. By using the discrimination values of the confidential information embedding unit (a portion of blocks having the value $C_{ij}$ near C), the digital watermark embedding circuit 204 determines the block order same as the block order of blocks constituting the parity data D3.

With the above configuration, since the confidential information D3 can be embedded without actually operating the original image data G, it becomes possible to reduce the number of blocks to be operated and make the numbers of blocks uniform. It is also possible to further suppress the influence of the original image data G upon the image quality.

(5) With the embedding method of the embodiment, the data D2 detected from the original image data G is error-correction encoded as a single block of data. The embodiment is not limited only to the above. For example, the data D2 detected from the original image data G may be divided into a plurality of partial data blocks, and each partial data block or each partial data block with some overlapped block is error-correction encoded.

(6) With the embedding method of the embodiment, after the original image data G is divided into a plurality of blocks, the embedding information D1 and confidential information D3 is embedded by calculating the average value of luminances of each block. Furthermore, the error correction encoding method may use codes other than (15, 7, 5) BCH codes. The embodiment is not limited only to the above.

For example, information may be embedded in a predetermined frequency band by frequency transforming one or more blocks through frequency transform methods such as wavelet transform and discrete cosine transform. Fourier transform may be used. Alternatively, information may be embedded in a spatial area by operating pixels of an image.

By the way, when the embedding process is executed by using the frequency transform method, the public information D1 and confidential information D3 can be embedded in different frequency areas respectively. In such case, the image quality deterioration can be further suppressed and resistance of the public information D1 and confidential information D3 can be further improved.

More specifically, the whole of the original image data G is subject to Fourier transform. Some candidates for the information embedding unit are determined from the Fourier transformed values, depending upon the durability or the like. A portion of the determined candidates is used as the public information embedding unit (the information embedding area basing upon the public key information kp), and the other remaining portion is used as the confidential information embedding unit (the information embedding area basing upon the confidential key information ks) or as the non-information embedding unit (an area embedded with no information). In this manner, the principle similar to the embedding method of the embodiment can be used.

The embedding information D1 and confidential information D3 may be embedded in the original image data G by using a combination of a plurality of different embedding methods described above.

Various error correction encoding method may be used such as a different block encoding method and a convolutional encoding method (tree encoding method).

The digital data to be embedded may be not only digital image data, but also other digital data such as moving image data, text data, voice data, graphics data, and program data. Any type of digital data can use the embedding method of this embodiment, and the key information necessary for embedding and extracting the embedding information D1 can be made public.

By utilizing the modifications (1) to (6) of the first embodiment, the embedding and extracting method can be realized which provides a variety of advantageous effects such as improvements on durability of embedding information, improvements on ability (i.e., error correction ability) of recovering the embedding information extracted information, and suppression of image quality deterioration of an original image.

Second Embodiment

Figure 9:
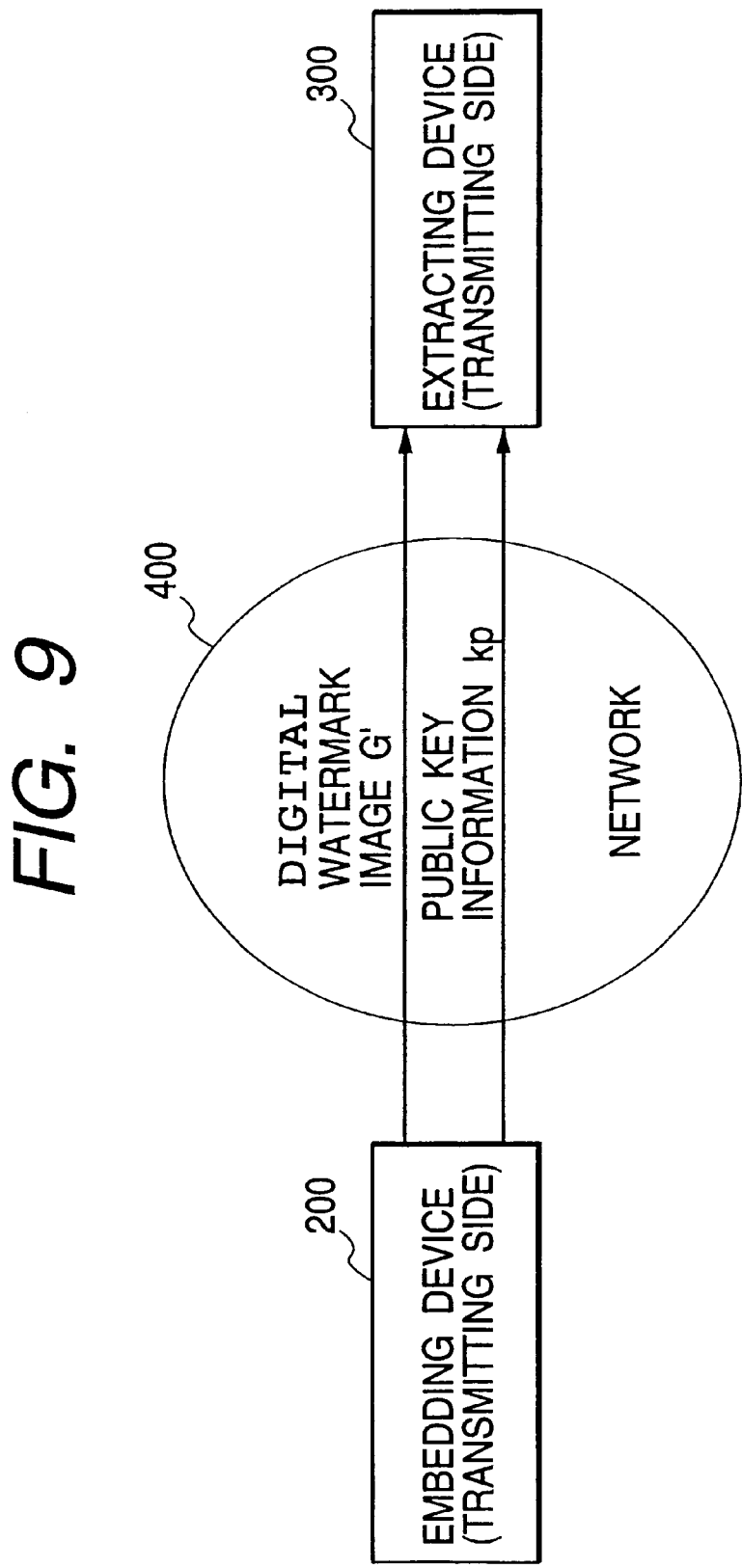
FIG. 9 is a diagram illustrating an example of a system including an embedding apparatus and an extracting apparatus according to a second embodiment of the invention.

In a second embodiment, an example of a system having the embedding apparatus 200 and extracting apparatus 300 of the first embodiment will be described with reference to FIG. 9. In the second embodiment, constituents having similar structure and function to those of the first embodiment are represented by using identical reference numerals, and the detailed description thereof is omitted.

The system of the second embodiment uses a network 400 such as a public telephone line, the Internet, and Ethernet. The system is applicable to a digital information distribution system and an electronic commerce system for distributing, buying, and selling digital data such as still image data, moving image data, voice data, text data, graphics data, and program data.

In the second embodiment, similar to the first embodiment, the embedding apparatus 200 embeds the embedding information D1 in the original image data G in accordance with the public key information kp. Next, similar to the first embodiment, the embedding apparatus 200 embeds the confidential information (in the first embodiment, parity data D3) necessary for recovering the embedded information D1, in the original image data G.

The embedding apparatus 200 transmits the digital watermark image data G' embedded with the embedding information D1 and confidential information to the network 400 in accordance with a predetermined protocol (e.g., a protocol for a digital information distribution system or an electronic commerce system).

The public key information kp is information made public. The public key information is not necessary to be kept in secret at the embedding apparatus 200 and extracting apparatus 300, but can be transferred freely between the embedding apparatus 200 and extracting apparatus 300 via the network. In the second embodiment, the public key information kp is transmitted by adding it to the digital watermark image data G'.

In the system of the second embodiment, the extracting apparatus 300 extracts the embedded information D1 from the digital watermark image data G' in accordance with the public key information kp. Similar to the first embodiment, the extracting apparatus 300 can recover the embedded information D1 by using confidential information embedded in the digital watermark image data G'. By comparing the embedded information D1 extracted by using the public key information kp with the embedded information D1 recovered by using the confidential information, any alteration of the digital watermark image data G' can be detected.

As above, similar to the first embodiment, in the second embodiment it is not necessary to keep in secret the public key information kp necessary for embedding the embedding information D1 and the public key information kp can be made public to general users. It is therefore possible to configure a system which is easy to manage the public key information kp and permits any user to confirm the contents of the embedding information D1.

Also similar to the first embodiment, in the second embodiment, since the confidential information D3 necessary for recovering the embedding information D1 is embedded in the original image data G, the copyright of the original image data G can be protected sufficiently.

In the second embodiment, the embedding apparatus 200 adds the public key information kp to the digital watermark image data G' in accordance with a predetermined file format. For example, in the case of an image file format constituted of an image data field and an image header field, the digital watermark image data G' is loaded in the image data field, and the public key information kp is loaded in the image header field as attribute information. The structure of the file format will be described in detail in a fourth embodiment.

In the second embodiment, the digital watermark image data G' added with the public key information kp is transmitted. The embodiment is not limited only to the above. For example, the digital watermark image data G' and the public key information kp may be transmitted separately.

Also in the second embodiment, in order to check legitimacy of the public key information kp sent from the embedding apparatus 200, a digital signature of a transmitter in conformity with a public key cryptosystem may be added to the public key information kp. Also in this case, the public key information kp is not necessary to be transmitted in secret. It is therefore possible to provide a system which is difficult to destroy or alter the embedding information D1 and further improves security and reliability.

Third Embodiment

Figure 10:
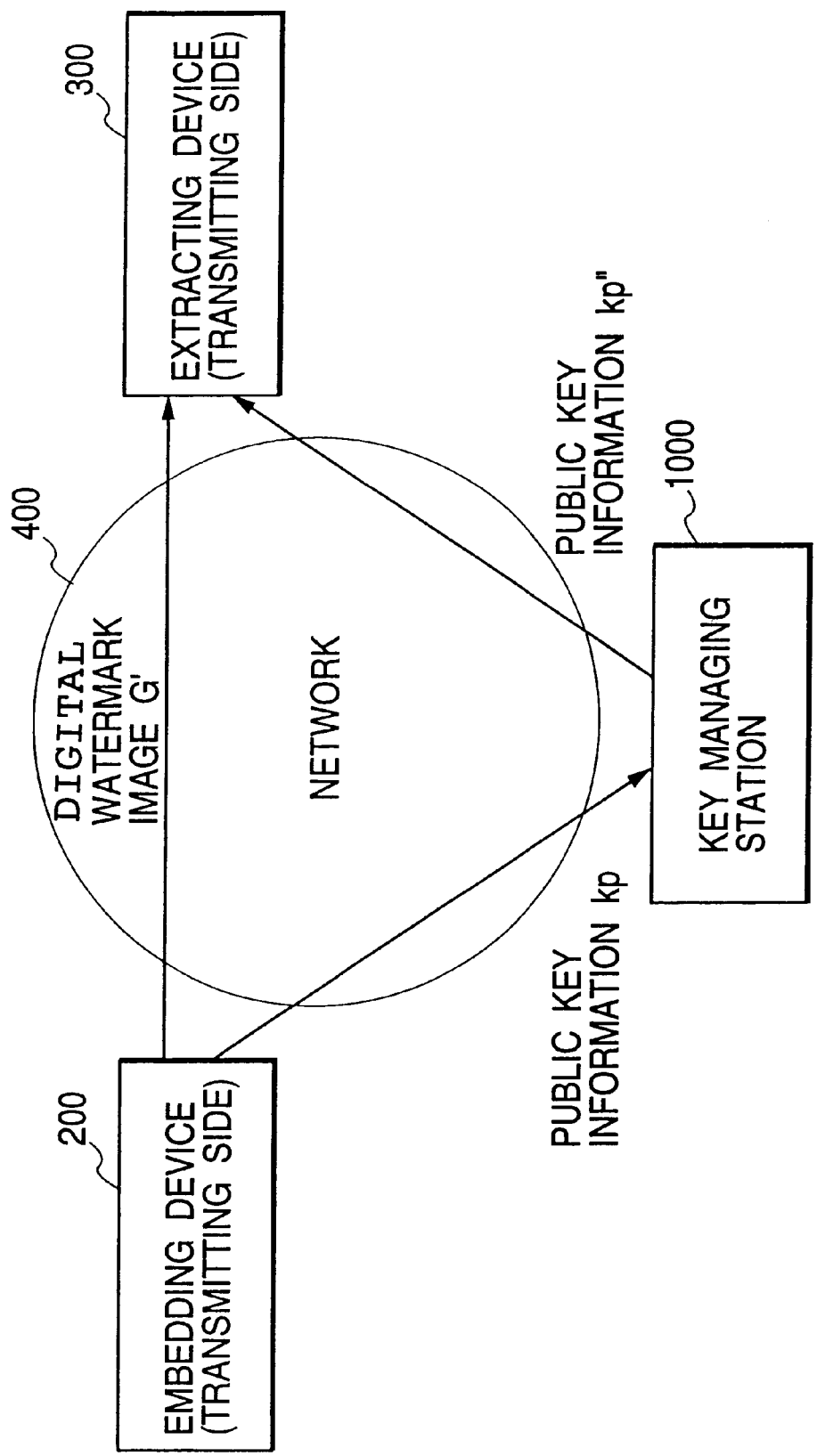
FIG. 10 is a diagram illustrating an example of a system including an embedding apparatus and an extracting apparatus according to a third embodiment of the invention.

In a third embodiment, an example of a system having the embedding apparatus 200 and extracting apparatus 300 of the first embodiment will be described with reference to FIG. 10. In the third embodiment, constituents having similar structure and function to those of the first embodiment are represented by using identical reference numerals, and the detailed description thereof is omitted.

The system of the third embodiment uses a key managing station in addition to the configuration of the second embodiment. Functions and structures of the third embodiment different from the second embodiment will be described in detail.

The system of the third embodiment uses a network 400 including the key managing station 1000, the network being a public telephone line, the Internet, Ethernet or the like. The system is applicable to a digital information distribution system and an electronic commerce system for distributing, buying, and selling digital data such as still image data, moving image data, voice data, text data, graphics data, and program data.

Similar to the second embodiment, in the system of the third embodiment, in order to check legitimacy of the public key information kp sent from the embedding apparatus 200, a digital signature of a transmitter in conformity with a public key cryptosystem may be added to the public key information kp. However, in the system of third embodiment, the key management station 1000 adds a digital signature in conformity with a public key cryptosystem to the public key information kp sent from the embedding apparatus. Namely, the key managing station 1000 guarantees the legitimacy of the public key information kp.

It is therefore possible to provide a system which is difficult to destroy or alter the embedding information D1 and further improves security and reliability.

With this configuration of the third embodiment, the key managing station 1001 has a function similar to an authentication station of the public key cryptosystem.

The "authentication station" is a facility which issues a certificate of a user public key in order to guarantee the legitimacy of the user public key of the public key cryptosystem. Namely, the authentication station generates and issues a certificate by making a signature to a user public key and user related data, by using a secret key. A user received a public key with a certificate from another user inspects the certificate by using the public key of the authentication station to confirm the legitimacy (at least confirming that the user is permitted by the authentication station) of the user which sent the public key. Enterprises such as "VeriSign" and "CyberTrust" are well-known facilities running such an authentication station.

The key managing station 1000 makes a signature to the public key information kp sent from the embedding apparatus 200, and sends the results to the extracting apparatus as public key information kp'.

The extracting apparatus 300 extracts the embedded information D1 from the digital watermark image data G' sent from the embedding apparatus 200, by using the public key information kp' sent from the key managing station 1000.

In this embodiment, although the public key information kp' signed at the key managing station 1000 is supplied to the extracting apparatus 300, the public key information kp' may be supplied, for example, to the embedding apparatus 200. In this case, the embedding apparatus 200 supplies the public key information kp' together with the digital watermark image data G' to the extracting apparatus 300.

The key managing station 1000 may be functioned as an illegal distribution inspection center or the like.

The digital watermark image data G' to be transmitted from the embedding apparatus 200 may be enciphered.

Fourth Embodiment

In a fourth embodiment, a file format to be used when the embedding apparatus 200 of the first to third embodiments transmits the digital watermark image data G' and public key information kp to the network, will be described in detail.

In a general image file format, the digital watermark image data G' is loaded in the image data field and the corresponding public key information kp is loaded in the image header field.

In a PlashPix (TM) file format to be described below, the public key information kp and digital image data can be loaded hierarchically. The public key information kp and the like can be loaded in a property set as attribute information.

Description of General Image Format

As shown in FIG. 11, with a general image format, an image file is divided into an image header field (unit) 1101 and an image data field (unit) 1102.

Generally, the image header field 1101 stores information necessary for reading the image data from the image file and additional information describing the contents of an image. In an example shown in FIG. 11, image attribute information is loaded in the image header field 1101. The image attribute information includes public key information kp, image format identification data indicating the image format name, a file size, an image width, an image height, an image depth, a presence/absence of compression, a resolution, an offset to a storage location of image data, and a color pallet size. The image data field 1102 stores the image data itself.

Typical examples of such an image format are well-known BMP format of Microsoft Corporation and GIF format of Compuserve Corporation.

Description of FlashPix (TM) File Format

In the FlashPix file format (FlashPix is a registered trademark of Eastman Kodak Company in USA), the image attribute information to be stored in the image header field and the image data to be stored in the image data field are stored hierarchically in the image file. The hierarchically structured image file format will be described with reference to FIGS. 12 and 13.

Each property and data in the file can be accessed by a storage and a stream which correspond to a directory and a file of MS-DOS.

Figure 12:
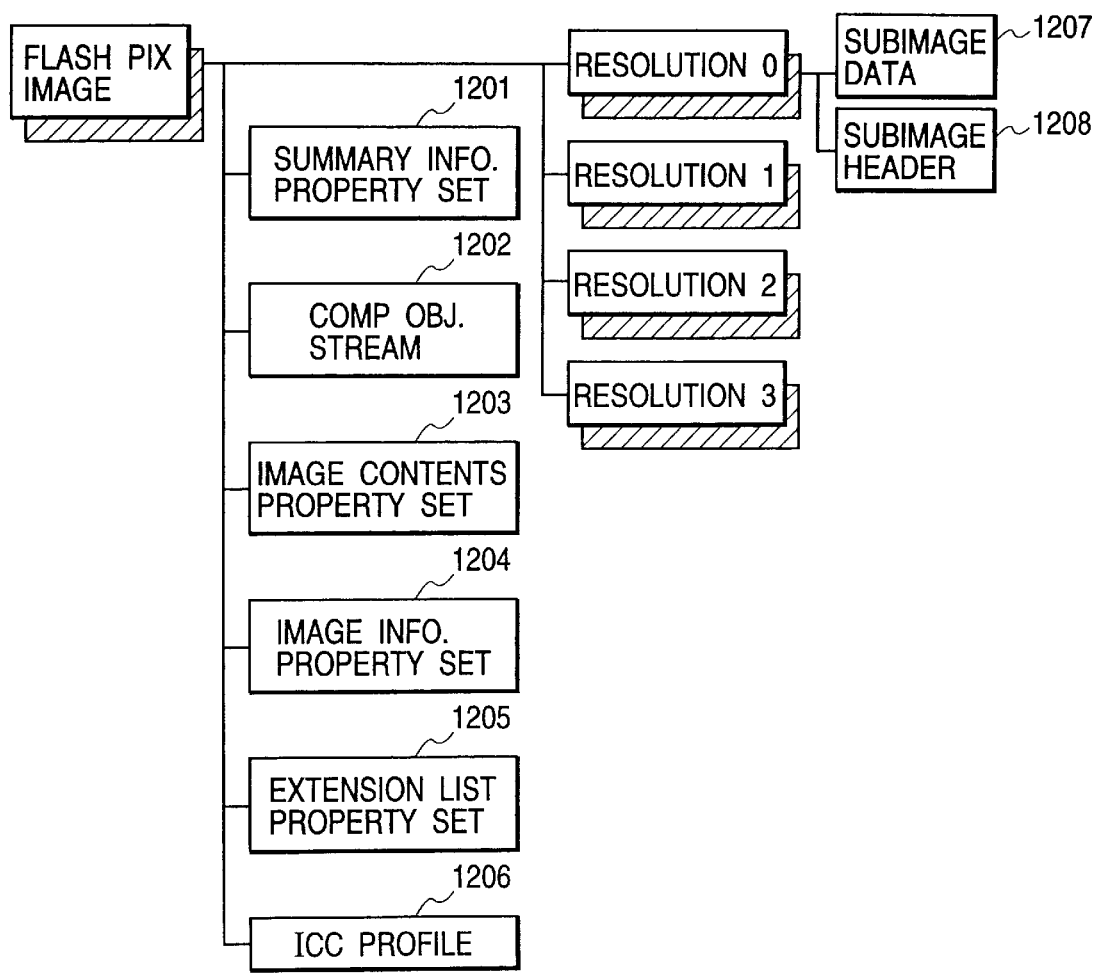
FIG. 12 is a diagram illustrating an example of a hierarchical image format according to a fourth embodiment of the invention.
Figure 13:
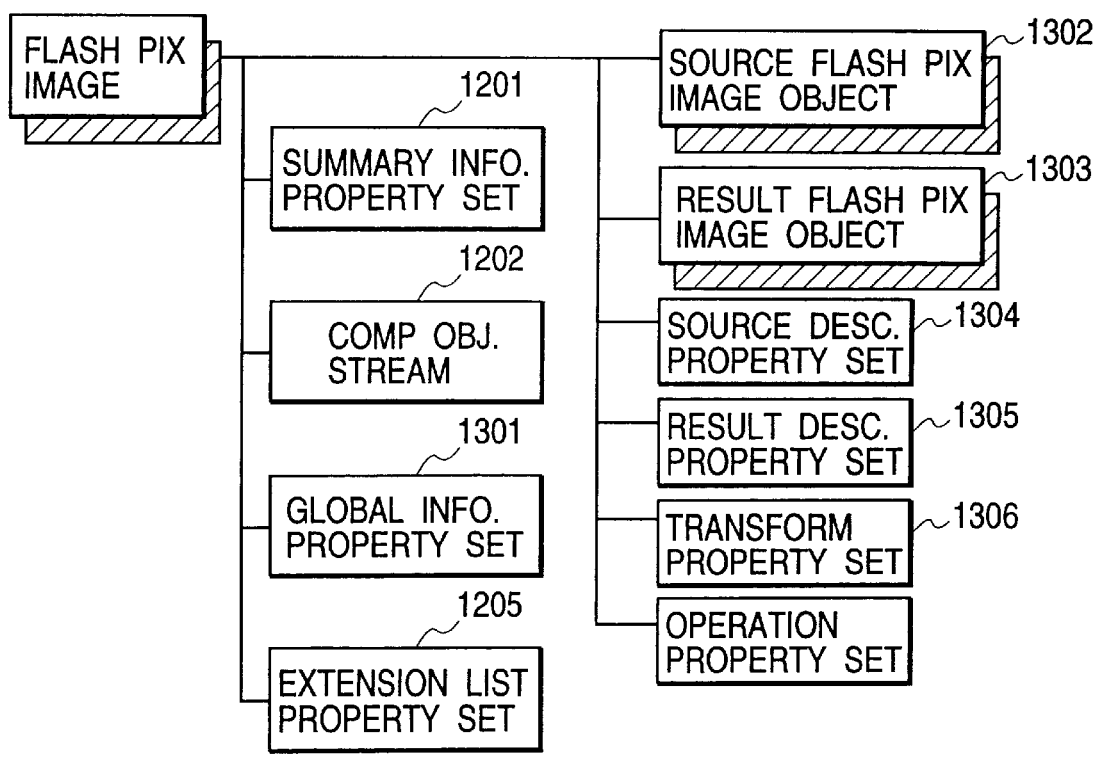
FIG. 13 is a diagram illustrating another example of a hierarchal image format.

Referring to FIGS. 12 and 13, a slashed box indicates a storage, and a non-slashed box indicates a stream. The image data and image attribute information are stored in the stream.

As shown in FIG. 12, the image data is hierarchically stored in accordance with a resolution. Images having different resolutions are called subimages having resolutions 0, 1, . . . , n. Information necessary for reading image data at each resolution is stored in a subimage header field 1208 and the image data is stored in a subimage data field 1207.

Property sets shown in FIGS. 12 and 13 are image attribute information classified and defined in accordance with the use purpose and contents. The property sets include a summary information property set, an image information property set, an image content property set, an extension list property set, and other property sets.

The summary information property set 1201 shown in FIGS. 12 and 13 is not specific to FlashPix, but is essential for the structured storage of Microsoft Corporation. This property set stores a title, an author, a thumbnail image, and the like of the image file.

A comp object stream 1202 shown in FIGS. 12 and 13 stores general information regarding the storage.

The image content property set 1203 shown in FIG. 12 describes a storage method for image data. For example, as shown in FIG. 14, the image content property set describes the number of hierarchical levels of image data, the width and height of an image having a highest resolution, the width, height, and color compositions of an image at each resolution, a definition of a quantization table/Huffman table to be used for JPEG compression, and the like.

The extension list property set 1205 shown in FIGS. 12 and 13 is a field to be used when information not contained in the fundamental specification of FlashPix is added. Therefore, the public key information kp of the embodiment is stored, for example, in this field.

An ICC profile 1207 shown in FIG. 12 describes a color space conversion profile stipulated by ICC (International Color Consortium).

The image information property set 1204 shown in FIG. 12 stores various information such as the following information (1) to (9) capable of being used when image data is used, the information including such as information on how the image is fetched and information on how the image can be used.

(1) Information on how digital data is fetched and/or generated.

(2) Information on copyright.
(3) Information on the contents (person, location, and the like in an image).
(4) Information on a camera used for image pickup.
(5) Information on settings (exposure, shutter speed, focal length, presence/absence of a flash) of a camera used for image pickup.
(6) Information on a resolution and mosaic filter specific to a digital camera.
(7) Information on a manufacture name, product name, type (negative/positive, color/white-black), and the like of a film.
(8) Information on a type and size of an original if it is a book or printed matter.
(9) Information on a user and scanner software if an image was scanned.

A FlashPix image view object shown in FIG. 13 is an image file for storing both image data and viewing parameters used when the image is displayed. The viewing parameters are a set of processing coefficients used when an image is displayed, the processing includes image rotation, magnification/reduction, transfer, color conversion, and filtering.

A global information property set 1301 shown in FIG. 13 describes a locked attribute list such as an index of a largest image, an index of a largest change item, information on a final modifier, and the like.

Source/result FlashPix image objects 1302 and 1303 shown in FIG. 13 are an entity of FlashPix image data. The source FlashPix image object 1302 is essential, and the result FlashPix image object 1303 is optional. The source FlashPix image object 1302 stores original image data, and the result FlashPix image object 1303 stores image data processed by using viewing parameters.

Source/result desc. property sets 1304 and 1305 shown in FIG. 13 are property sets for discriminating between images, and store an image ID, a change prohibited property set, a final update date and time, and the like.

A transform property set 1306 shown in FIG. 13 stores Affine conversion coefficients for image rotation, magnification/reduction, and transfer, a color conversion table, contrast adjustment values, and filtering coefficients.

The invention may be embodied in other specific forms without departing from the spirit or essential characteristics thereof.

For example, part or the whole of the embedding and extracting method of the embodiments may be executed under the control of software.

In this case, a storage medium (i.e., storage media 206, 306, 804 shown in FIGS. 2, 3, and 8) storing program codes of the software realizing the functions of each of the first to third embodiments is supplied to the apparatus of each embodiment (i.e., embedding apparatuses 200, 300, and 800 shown in FIGS. 2, 3, and 8).

The functions of each embodiment can be realized by making the control circuit (i.e., control circuits 205, 305, and 803 shown in FIGS. 2, 3, and 8) of the apparatus of each embodiment read and execute the program codes stored in the storage medium.

In this case, the program codes themselves read from the storage medium realize the functions of each embodiment, so that the storage medium storing the program codes constitute the present invention.

The storage medium storing such program codes may be a floppy disk, a hard disk, an optical disk, a magneto-optical disk, a CD-ROM, a magnetic tape, a non-volatile memory card, a ROM, and a like.

The functions of each of the first to third embodiments can be realized by making an OS (operating system), application software, or the like running on the control circuit of each embodiment execute part or the whole of actual processing in accordance with the program codes read from the storage medium.

Furthermore, the functions of each of the first to third embodiments can be realized by making a control circuit of an function expansion unit execute part or the whole of actual processing in accordance with the program codes read from the storage medium and stored in a memory of the function expansion unit connected to the control circuit of each embodiment.

Therefore, the above-described embodiments are merely examples in all respects, and must not be construed to limit the invention.

The scope of the present invention is defined by the scope of the appended claims, and is not limited at all by the specific descriptions of this specification. Furthermore, all the modifications and changes belonging to equivalents of the claims are considered to fall within the scope of the present invention.

What is claimed is:

1. A data processing apparatus, comprising:
   a first embedding unit adapted to embed first information in digital image data in accordance with a first embedding method which utilizes publicly available information; and
   a second embedding unit adapted to embed second information in the digital image data having the first information embedded therein in accordance with a second embedding method which utilizes secret information that is not made publicly available, the second information being used to detect whether the first information is altered.

2. A data processing apparatus according to claim 1, wherein said first embedding unit is adapted to embed the first information in a first area of the digital image data, and wherein said second embedding unit is adapted to embed the second information in a second area of the digital image data.

3. A data processing apparatus according to claim 1, wherein the second information is also used to recover alteration of the first information if the first information is altered.

4. A data processing apparatus according to claim 1, wherein the first information includes information relating to a copyright of the digital image data.

5. A data processing apparatus according to claim 1, wherein said data processing apparatus is applicable to a personal computer, a digital camera, a digital video recorder or a scanner.

6. A data processing apparatus according to claim 1, wherein said first embedding unit is adapted to embed the first information in the digital image data invisibly, and wherein said second embedding unit is adapted to embed the second information in the digital image data invisibly.

7. A data processing apparatus according to claim 1, wherein said second embedding unit is adapted to embed the second information in the digital image data after the first information is embedded in the digital image data.

8. A data processing apparatus according to claim 7, wherein said first embedding unit is adapted to embed the first information in the digital image data invisibly, and wherein said second embedding unit is adapted to embed the second information in the digital image data invisibly.

9. A data processing method, comprising the steps of:

embedding first information in digital image data in accordance with a first embedding method which utilizes publicly available information; and embedding second information in the digital image data having the first information embedded therein in accordance with a second embedding method which utilizes secret information that is not made publicly available, the second information being used to detect whether the first information is altered.

10. A data processing method according to claim 9, wherein said first embedding step embeds the first information in a first area of the digital image data, and wherein said second embedding step embeds the second information in a second area of the digital image data.

11. A data processing method according to claim 9, wherein the second information is also used to recover alteration of the first information if the first information is altered.

12. A data processing method according to claim 9, wherein the first information includes information relating to a copyright of the digital image data.

13. A data processing method according to claim 9, wherein said data processing method is applicable to a personal computer, a digital camera, a digital video recorder or a scanner.

14. A data processing method according to claim 9, wherein said first embedding step embeds the first information in the digital image data invisibly, and wherein said second embedding step embeds the second information in the digital image data invisibly.

15. A date processing method according to claim 9, wherein said second embedding step embeds the second information in the digital image data after the first information is embedded in the digital image data.

16. A data processing method according to claim 15, wherein said second embedding step embeds the first information in the digital image data invisibly, and wherein said second embedding step embeds the second information in the digital image data invisibly.

17. A data processing apparatus comprising:
a first extracting unit adapted to extract first information from digital image data, the first information being embedded in the digital image data in accordance with a first embedding method which utilizes publicly available information; and
a second extracting unit adapted to extract second information from the digital image data, the second information being embedded in the digital image data in accordance with a second embedding method which utilizes secret information that is not made publicly available, the second information being used to detect whether the first information is altered.

18. A data processing apparatus according to claim 17, wherein said first extracting unit is adapted to extract the first information in a first area of the digital image data, and wherein said second extracting unit is adapted to extract the second information in a second area of the digital image data.

19. A data processing apparatus according to claim 17, further comprising a recovering unit adapted to use the extracted second information to recover alteration of the extracted first information.

20. A data processing apparatus according to claim 17, wherein the first information includes information relating to a copyright of the digital image data.

21. A data processing apparatus according to claim 17, wherein said data processing apparatus is applicable to a personal computer, a digital camera, a digital video recorder or a scanner.

22. A data processing apparatus according to claim 17, wherein the first information extracted by the first extracting unit is invisibly embedded in the digital image data, and wherein the second information extracted by the second extracting unit is invisibly embedded in the digital image data.

23. A data processing apparatus according to claim 17, wherein said second extracting unit is adapted to extract the second information from the digital image data after the first information is extracted from the digital image data.

24. A data processing apparatus according to claim 23, wherein the first information extracted by the first extracting unit is invisibly embedded in the digital image data, and wherein the second information extracted by the second extracting unit is invisibly embedded in the digital, image data.

25. A data processing method comprising the steps of:
extracting first information from digital image data, the first information being embedded in the digital image data in accordance with a first embedding method which utilizes publicly available information; and
extracting second information from the digital image data, the second information being embedded in the digital image data in accordance with a second embedding method which utilizes secret information that is not made publicly available, the second information being used to detect whether the first information is altered.

26. A data processing method according to clam 17, wherein said first extracting step extracts the first information in a first area of the digital image data, and wherein said second extracting step extracts the second information in a second area of the digital image data.

27. A data processing method according to claim 25, further comprising a step of using the extracted second information to recover alteration of the extracted first information.

28. A data processing method according to claim 25, wherein the first information includes information relating to a copyright of the digital image data.

29. A data processing method according to claim 25, wherein said data processing method is applicable to a personal computer, a digital camera, a digital video recorder or a scanner.

30. A data processing method according to claim 25, wherein the first information extracted by the first extracting step is invisibly embedded in the digital image data, and wherein the second information extracted in the second extracting step is invisibly embedded in the digital image data.

31. A data processing method according to claim 25, wherein said second embedding step extracts the second information from the digital image data after the first information is extracted from the digital image data.

32. A data processing method according to claim 31, wherein the first information extracted in the first extracting step is invisibly embedded in the digital image data, and wherein the second information extracted in the second extracting step is invisibly embedded in the digital image data.

33. A storage medium storing a program for performing a data processing method, the program comprising the steps of:
embedding first information in digital image data in accordance with a first embedding method which utilizes publicly available information; and
embedding second information in the digital image data having the first information embedded therein in accordance with a second embedding method which utilizes secret information that is not made publicly available, the second information being used to detect whether the first information is altered.

34. A storage medium according to claim 33, wherein said first embedding step embeds the first information in a first area of the digital image data, and wherein said second embedding step embeds the second information in a second area of the digital image data.

35. A storage medium according to claim 33, wherein the second information is also used to recover alteration of the first information if the first information is altered.

36. A storage medium according to claim 33, wherein the first information includes information relating to a copyright of the digital image data.

37. A storage medium according to claim 33, wherein said program is applicable to a personal computer, a digital camera, a digital video recorder or a scanner.

38. A storage medium according to claim 33, wherein said first embedding step embeds the first information in the digital image data invisibly, and wherein said second embedding step embeds the second information in the digital image data invisibly.

39. A storage medium according to claim 33, wherein said second embedding step embeds the second information in the digital image data after the first information is embedded in the digital image data.

40. A storage medium according to claim 39, wherein said second embedding step embeds the first information in the digital image data invisibly, and wherein said second embedding step embeds the second information in the digital image data invisibly.

41. A storage medium storing a program for performing a data processing method, the program comprising the steps of:

extracting first information from digital image data, the first information being embedded in the digital image data in accordance with a first embedding method which utilizes publicly available information; and extracting second information from the digital image data, the second information being embedded in the digital image data in accordance with a second embedding method which utilizes secret information that is not made publicly available, the second information being used to detect whether the first information is altered.

42. A storage medium according to claim 41, wherein said first extracting step extracts the first information from a first area of the digital image data, and wherein said second extracting step extracts the second information from a second area of the digital image data.

43. A storage medium according to claim 41, further comprising a step of using the extracted second information to recover alteration of the extracted first information.

44. A storage medium according to claim 41, wherein the first information includes information relating to a copyright of the digital image data.

45. A storage medium according to claim 41, wherein said program is applicable to a personal computer, a digital camera, a digital video recorder or a scanner.

46. A storage medium according to claim 41, wherein the first information extracted in the first extracting step is invisibly embedded in the digital image data, and wherein the second information extracted in the second extracting step is invisibly embedded in the digital image data.

47. A storage medium according to claim 41, wherein said second embedding step extracts the second information from the digital image data after the first information is extracted from the digital image data.

48. A storage medium according to claim 47, wherein the first information extracted in the first extracting step is invisibly embedded in the digital image data, and wherein the second information extracted in the second extracting step is invisibly embedded in the digital image data.

* * * * *

UNITED STATES PATENT AND TRADEMARK OFFICE
CERTIFICATE OF CORRECTION

PATENT NO. : 6,807,285 B1
DATED : October 19, 2004
INVENTOR(S) : Iwamura

It is certified that error appears in the above-identified patent and that said Letters Patent is hereby corrected as shown below:

Column 1,
Line 41, "has" should read -- have --; and
Line 49, "are" should read -- is --.

Column 5,
Line 27, "D1 are" should read -- D1) are --;
Line 28, "includes;" should read -- includes: --;
Line 36, "procedure)," should read -- procedure, --; and
Line 62, "includes;" should read -- includes: --.

Column 8,
Line 31, "exceeds" should read -- exceed --.

Column 9,
Line 52, ""$C \geq C_{ij}$," should read -- "$C \geq C_{ij}$," --; and
Line 53, "This" should read -- These --.

Column 10,
Line 17, "step S 419." should read -- step S409. --.
Line 31, "$C_{ij}$," should read -- $C_{ij}$ --;
Line 32, ""$C \leq C_{ij}$," should read -- "$C \leq_{ij}$" --; and
Line 33, ""$C \geq C_{ij}$." should read -- "$C \geq C_{ij}$". --.

Column 13,
Line 5, ""$C \geq C_{ij}$" should read -- "$C \geq C_{ij}$" --.

Column 14,
Line 63, "method" should read -- methods --.

Column 17,
Line 51, "PlashPix" should read -- FlashPix --.

Column 19,
Line 67, "a like." should read -- the like. --.

Column 21,
Line 29, "date" should read -- data --.

UNITED STATES PATENT AND TRADEMARK OFFICE
CERTIFICATE OF CORRECTION

PATENT NO.    : 6,807,285 B1
DATED         : October 19, 2004
INVENTOR(S)   : Iwamura It is certified that error appears in the above-identified patent and that said Letters Patent is hereby corrected as shown below:

Column 22,
Line 14, "digital," should read -- digital --;
Line 27, "clam 17," should read -- claim 25, --.

Signed and Sealed this

Twenty-eighth Day of February, 2006

JON W. DUDAS
*Director of the United States Patent and Trademark Office*